US009755997B2

(12) United States Patent
Li et al.

(10) Patent No.: US 9,755,997 B2
(45) Date of Patent: Sep. 5, 2017

(54) EFFICIENT PEER-TO-PEER COMMUNICATION SUPPORT IN SOC FABRICS

(75) Inventors: Bin Li, Portland, OR (US); Li Zhao, Beaverton, OR (US); Ravishankar Iyer, Portland, OR (US); Rameshkumar G. Illikkal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 13/810,033

(22) PCT Filed: Jan. 13, 2012

(86) PCT No.: PCT/US2012/021187
§ 371 (c)(1),
(2), (4) Date: Mar. 14, 2013

(87) PCT Pub. No.: WO2013/105967
PCT Pub. Date: Jul. 18, 2013

(65) Prior Publication Data
US 2013/0185370 A1    Jul. 18, 2013

(51) Int. Cl.
*H04L 12/58* (2006.01)
*G06F 13/40* (2006.01)
*H04L 12/933* (2013.01)
(52) U.S. Cl.
CPC .............. *H04L 51/04* (2013.01); *H04L 51/30* (2013.01); *G06F 13/4022* (2013.01); *G06F 2213/0038* (2013.01); *H04L 49/109* (2013.01)
(58) Field of Classification Search
None
See application file for complete search history.

(56) References Cited

U.S. PATENT DOCUMENTS 6,584,513 B1 *  6/2003  Kallat ................. G06F 13/28
                                                            710/22
6,636,928 B1 * 10/2003  Brooks ............ G06F 15/17375
                                                            710/112
(Continued)

FOREIGN PATENT DOCUMENTS

CN            1575459 A       2/2005
CN          101727413 A       6/2010
WO         2013/105967 A1     7/2013

OTHER PUBLICATIONS

Office Action received for Taiwan Patent Application No. 102100694, mailed on May 20, 2015, 8 pages of English Translation and 8 pages of Taiwan Office Action.
(Continued)

*Primary Examiner* — Backhean Tiv
(74) *Attorney, Agent, or Firm* — Law Office of R. Alan Burnett, P.S.

(57) ABSTRACT

Methods and apparatus for efficient peer-to-peer communication support in interconnect fabrics. Network interfaces associated with agents are implemented to facilitate peer-to-peer transactions between agents in a manner that ensures data accesses correspond to the most recent update for each agent. This is implemented, in part, via use of non-posted "dummy writes" that are sent from an agent when the destination between write transactions originating from the agent changes. The dummy writes ensure that data corresponding to previous writes reach their destination prior to subsequent write and read transactions, thus ordering the peer-to-peer transactions without requiring the use of a centralized transaction ordering entity.

21 Claims, 5 Drawing Sheets

(56) References Cited

U.S. PATENT DOCUMENTS

| | | | | |
|---|---|---|---|---|
| 6,950,438 | B1* | 9/2005 | Owen | H04L 69/12 |
| | | | | 370/409 |
| 8,982,734 | B2* | 3/2015 | Gasparakis | H04L 45/66 |
| | | | | 370/238 |
| 2005/0091432 | A1* | 4/2005 | Adams | G06F 13/4022 |
| | | | | 710/100 |
| 2006/0050693 | A1* | 3/2006 | Bury | H04L 49/90 |
| | | | | 370/389 |
| 2009/0274158 | A1* | 11/2009 | Sharp | H04L 67/104 |
| | | | | 370/400 |
| 2009/0307408 | A1* | 12/2009 | Naylor | G06F 13/4022 |
| | | | | 710/317 |
| 2010/0268990 | A1* | 10/2010 | Xu | G06F 11/26 |
| | | | | 714/27 |
| 2011/0296129 | A1* | 12/2011 | Arai | G06F 13/28 |
| | | | | 711/165 |
| 2012/0173846 | A1* | 7/2012 | Wang | G06F 1/32 |
| | | | | 712/32 |
| 2012/0233504 | A1* | 9/2012 | Patil | G06F 11/2242 |
| | | | | 714/30 |
| 2013/0083804 | A1* | 4/2013 | Khoo | H04L 45/60 |
| | | | | 370/401 |
| 2013/0166812 | A1* | 6/2013 | Boucard | G06F 13/405 |
| | | | | 710/314 |
| 2013/0185370 | A1* | 7/2013 | Li | H04L 51/30 |
| | | | | 709/206 |
| 2013/0268711 | A1* | 10/2013 | Safranek | G06F 13/16 |
| | | | | 710/308 |
| 2013/0304979 | A1* | 11/2013 | Zimmer | G06F 13/14 |
| | | | | 711/103 |
| 2013/0343229 | A1* | 12/2013 | Gasparakis | H04L 45/66 |
| | | | | 370/256 |
| 2014/0112339 | A1* | 4/2014 | Safranek | G06F 12/0831 |
| | | | | 370/389 |
| 2016/0179738 | A1* | 6/2016 | Guddeti | G06F 11/3027 |
| | | | | 714/56 |
| 2016/0283399 | A1* | 9/2016 | Das Sharma | G06F 12/1027 |
| 2016/0283429 | A1* | 9/2016 | Wagh | G06F 13/4022 |
| 2016/0299860 | A1* | 10/2016 | Harriman | G06F 13/36 |

OTHER PUBLICATIONS

Office Action received for Taiwan Patent Application No. 102100694, mailed on Nov. 25, 2015, 4 pages of English Translation and 5 pages of Taiwan Office Action.

International Search Report and Written Opinion of PCT/US2012/021187, mailed Jan. 13, 2012. 9 pages.

International Preliminary Report on Patentability and Written Opinion received for PCT Patent Application No. PCT/US2012/021187, mailed on Jul. 24, 2014, 6 Pages.

Office Action received for Chinese Patent Application No. 201280066986.1, mailed on Aug. 23, 2016, 7 pages of Chinese Office Action.

* cited by examiner

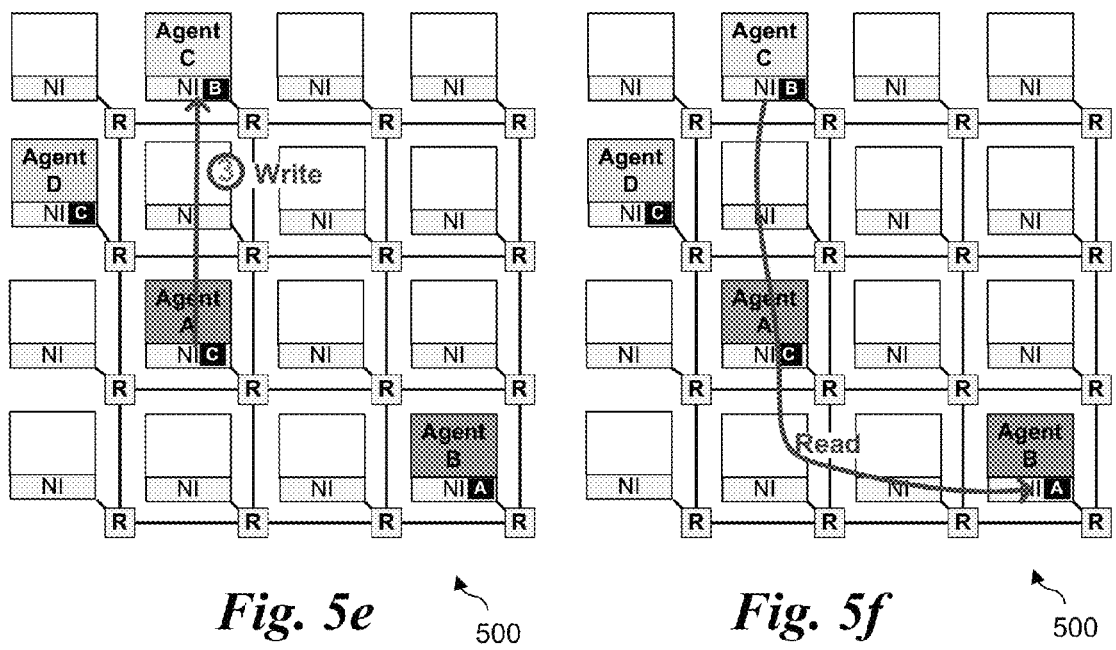
*Fig. 5e*  500    *Fig. 5f*  500

EFFICIENT PEER-TO-PEER COMMUNICATION SUPPORT IN SOC FABRICS

FIELD OF THE INVENTION

The field of invention relates generally to communication in computer systems and, more specifically but not exclusively relates to techniques for enhanced peer-to-peer communication in SoC fabrics.

BACKGROUND INFORMATION

Computer systems typically employ one or more interconnects to facilitate communication between system components, such as between processors and memory. Interconnects and/or expansion interfaces may also be used to support built-in and add on devices, such as IO (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended Industry Standard Architecture) and VESA Local Bus. In the early 1990's Intel Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates were increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO. Another standard serial interconnect that is widely used is PCI Express (PCIe), which was introduced in 2004 under the PCIe 1.0 standard.

More recently, architectures commonly referred to as "System on a Chip" (SoC), have become prevalent in the computer industry. Rather than have external interconnects between discreet components, SoC employ internal interconnect that facilitate communication between various embedded components, such as processor cores and other IP (Intellectual Property) blocks. These IP blocks are typically connected via one or more interconnect architectures, such as an interconnect mesh (e.g., a cross-bar type interconnect), also referred to as an interconnect fabric, or simply "fabric," and associated with agents that manage communication between the IP core components using an applicable communication protocol implemented by the interconnect.

Designing the communication fabric for SoCs can be very challenging. As the number of IP blocks on SoCs continue to increase, the amount of traffic congestion on interconnect fabrics likewise increases. However, bus-based or hierarchical-tree based fabrics encounter severe wire congestion and timing closure issues as more IP blocks and associated agents are integrated onto an SoC, limiting the scalability of these interconnect architectures. As a result, the on-chip communication fabrics of SoCs are now moving from buses and hierarchical tree fabric structures to more sophisticated interconnect fabrics, such as Networks-on-Chip (NoC), hybrid architectures and so on due to their scalability, modularity and ease for design reuse.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 5a-5f are schematic block diagrams used for illustrating a walk-through example of using dummy writes to ensure proper transaction ordering. a series of transactions.

DETAILED DESCRIPTION

Embodiments of methods and apparatus for efficient peer-to-peer communication support in SoC fabrics are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
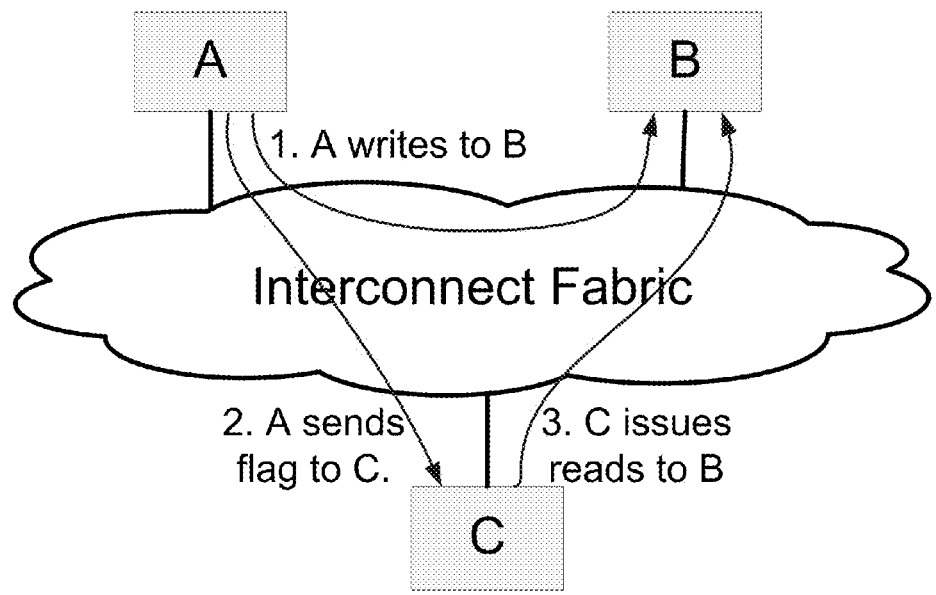
FIG. 1 is a schematic block diagram illustrating a series of messages sent between three agents coupled to an interconnect.

Peer-to-peer communication support is an important feature in SoC fabric design. A significant challenge for peer-to-peer communication is the requirement to ensure correct ordering. FIG. 1 shows an example of the ordering requirement. In this example, Agent A first issues writes to Agent B (step 1). Agent A then sends flag to Agent C to indicate it has written the data (step 2). When Agent C receives the flag, it issues reads to Agent B (step 3). The requirement is that Agent C needs to get the most recent data written by Agent A. However, if not designed correctly, the reads issued by Agent C may arrive at Agent B earlier than the data written by Agent A. As a result, Agent C may read stale data rather than the most recent data.

In current Intel® SoC platforms, peer-to-peer communication ordering is supported by buses and hierarchical tree fabric that support PCI-e ordering. However, when the interconnect structure moves from buses and hierarchical trees to more sophisticated fabric architectures, peer-to-peer support is becoming a significant challenge because ordering is not ensured in these advanced fabric architectures. One solution is to use a centralized ordering point in the interconnect fabric to ensure correct ordering is maintained. However, this approach increases the communication time and the centralized ordering point can become a bottleneck, as each request must be sent to the ordering point first for ordering before traveling to its destination. The designers can also use non-posted writes instead of posted writes for peer-to-peer communication. However, the non-posted write approach adds significant communication delay for peer-to-peer transactions because it requires an acknowledgement for each write issued before sending the next request, thus non-posted writes cannot meet the performance requirements in such systems.

Figure 2:
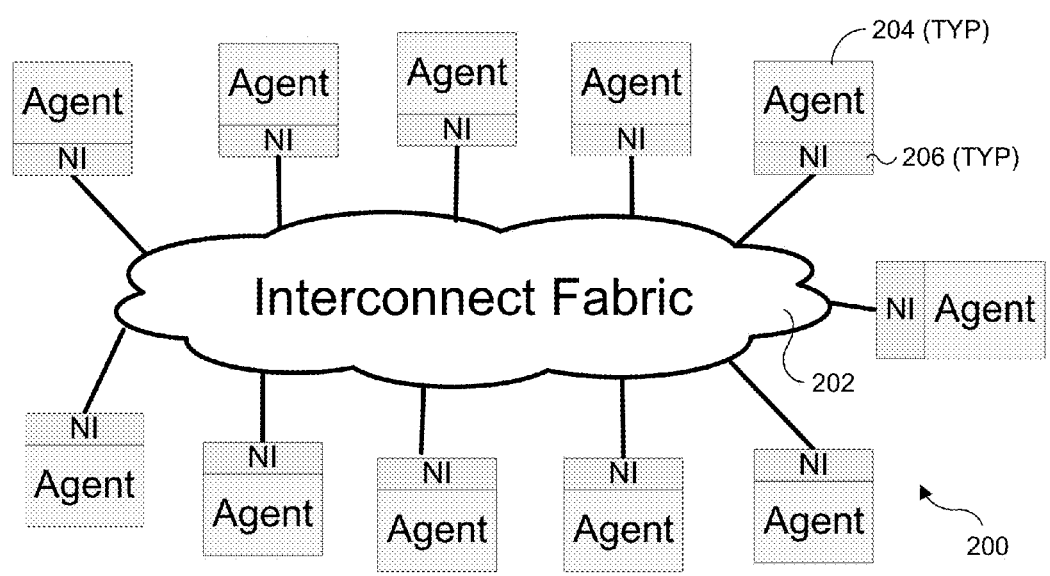
FIG. 2 is a schematic block diagram illustrating a plurality of agents connected to an interconnect, wherein each agent is associated with a network interface that facilities transaction ordering to ensure data access are not stale.

In view of the foregoing and other performance considerations, a low overhead design to support direct peer-to-peer communications without a centralized ordering point in the interconnect fabrics is now presented. FIG. 2 shows an example of an SoC platform 200 with an interconnect fabric 202 as the communication fabric. In this architecture, each Agent 204 is connected to the interconnect fabric through a network interface (NI) 206. The NI arbitrates requests from different queues and packetizes the winning request (as applicable) and sends the packet onto the interconnect fabric 202. The interconnect fabric then routes the packet towards its destination (i.e., another agent), and the destination NI de-packetizes the message and transfers the message to the destination agent. In general, the interconnect fabric 202 can be any fabric architecture, such as traditional buses, hierarchical tree, or more sophisticated fabric such as Network-on-chip (NoC), hybrid architectures, etc. Moreover, the technique works for any interconnect fabric that requires peer-to-peer ordering support in the fabric.

Figure 3:
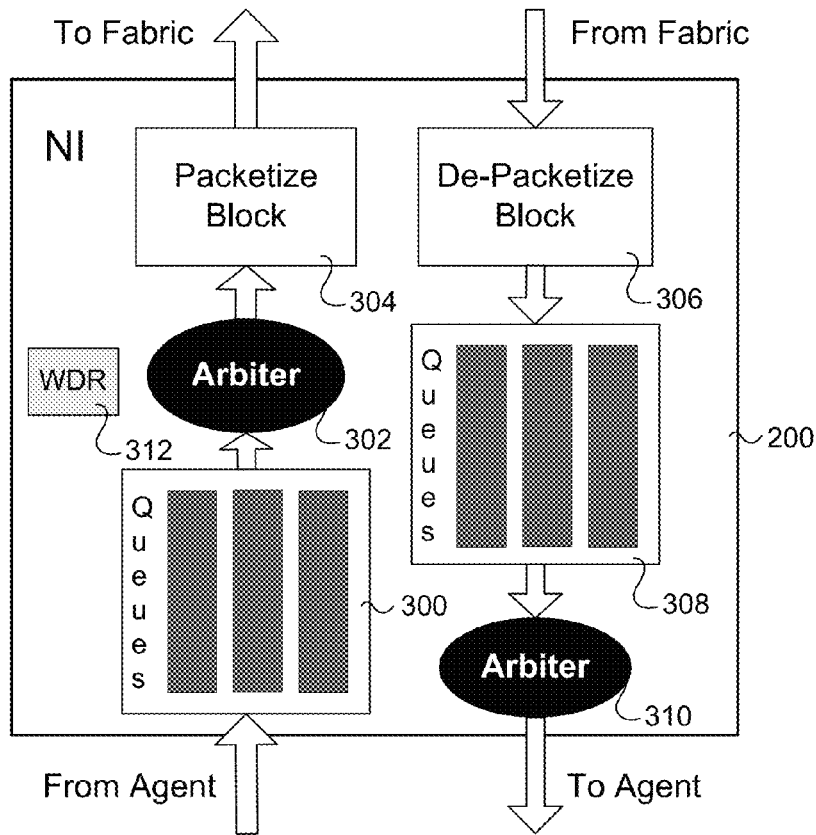
FIG. 3 is a schematic block diagram of one embodiment of a network interface.

FIG. 3 shows further details of NI 206, according to one embodiment. Outbound requests originating at an agent are buffered in outbound queues 300, with an arbiter 302 arbitrating the order in which the requests are to be sent out. In response to arbiter 302 selecting a request from queues 300, the request is packetize in a block 304 and sent out onto the fabric. Inbound requests comprise packets that are received from the fabric and destined for the agent. These packets are first de-packetized in a block 306, with the corresponding request data buffered in inbound queues 308. An arbiter 310 is then used to arbitrate the order in which the queued requests are forwarded to the agent. It is noted that NI 206 illustrated in FIG. 3 is just one example of an NI that supports peer-to-peer transactions, as other NI configurations may also be implemented For peer-to-peer communication, if two messages sent from different source agents are destined to the same destination agent and requires ordering, it is required that the messages sent first should arrive at the destination first. However, inside the fabric, as peer-to-peer messages from different source agents can take different routes to the same destination, it is highly likely that at some point a pair of messages destined for the same destination agent will arrive at the destination in different order from the time they are injected into the fabric. As a result, peer-to-peer ordering is not guaranteed.

The key consideration is the posted-write transaction ordering. To ensure proper peer-to-peer posted-write transaction ordering, a mechanism is implemented that guarantees posted-writes originating from the same source agent and going to different destination agents arrive at their respective destination in order. Using the example presented above in FIG. 1, Agent A writes to Agent B first (a first posted-write). Agent A then writes to Agent C indicating that it has written to Agent B (another posted-write). If at the time Agent C receives the message from Agent A, the posted-writes from Agent A have already arrived at Agent B, then when Agent C sends reads to Agent B, it is guaranteed to read the most up-to-date data. As a result, the ordering can be guaranteed to be correct.

In order to achieve this, in one embodiment a "Write Destination Register" (WDR) 312 is implemented in each NI 206, as shown in FIG. 3. This WDR register is used to record the destination ID for the most recent posted-write request issued from its attached agent. For a system with N agents, the WDR register size is only logN bits.

For each posted-write transaction issued from an agent, the agent's NI first checks the destination agent for this write as well as the previous (i.e., most recent) posted-write destination as recorded in its WDR.

Figure 4:
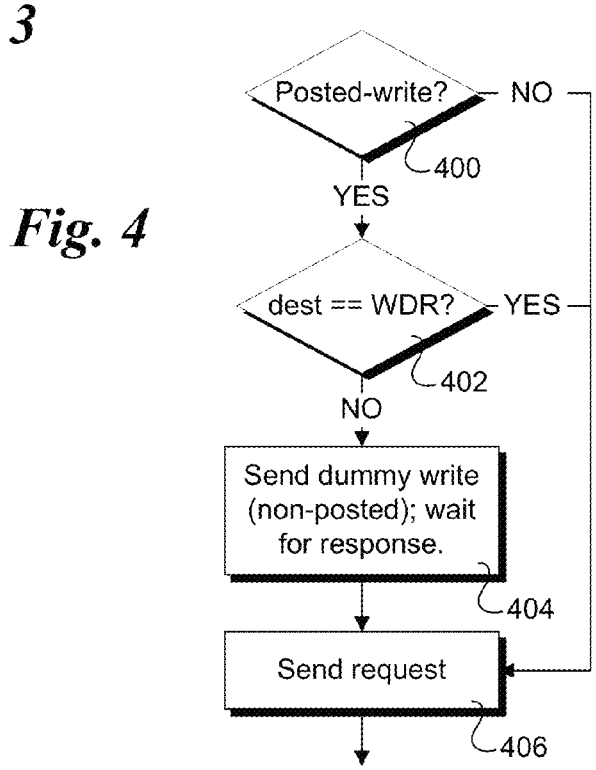
FIG. 4 is a flowchart illustrating logic and operations performed by network interfaces, according to one embodiment.

(a) If the previous posted-write and the current posted-write are to the same destination agent, the NI sends the write request onto the fabric directly. This logic for this is illustrated in the flowchart of FIG. 4, wherein the respective answers to decision block 400 and 402 and YES and NO, causing the flow to proceed to a block 406 in which the request is sent out onto the fabric. The fabric then routes the write request to the destination agent identified in the request. In this case, the WDR doesn't need to be updated, as the destination agent is the same as for the previous posted-write.

(b) If the NI detects that the previous posted-write and the current posted-write are to different agents, the answer to decision block 402 is NO, and the NI will first send out a "dummy write," such as a non-posted write or other type of transaction that will return an acknowledgement from the destination NI to the previous destination agent recorded by the WDR, as shown in a block 404. This "dummy write" is used to push all the previous posted-writes to their destination first. The NI then waits for an acknowledgement from the previous destination agent for this "dummy write." After receiving the acknowledgement, it is ensured that all the previous posted-writes have been pushed to the destination. The NI then issues the posted-write onto the fabric. The NI also updates its WDR to identify the new destination. As all the writes sent from this agent have arrived at their destination in order, it is guaranteed that any subsequent read requests to this destination will access the most recent data update.

For read transactions, the NI always sends the requests to the destination directly through the fabric (no dummy transaction required). This is depicted in FIG. 4 as the flow proceeding from a NO result from decision block 400 to send out the request in block 406.

Walkthrough Example

Figures 5A, 5B:
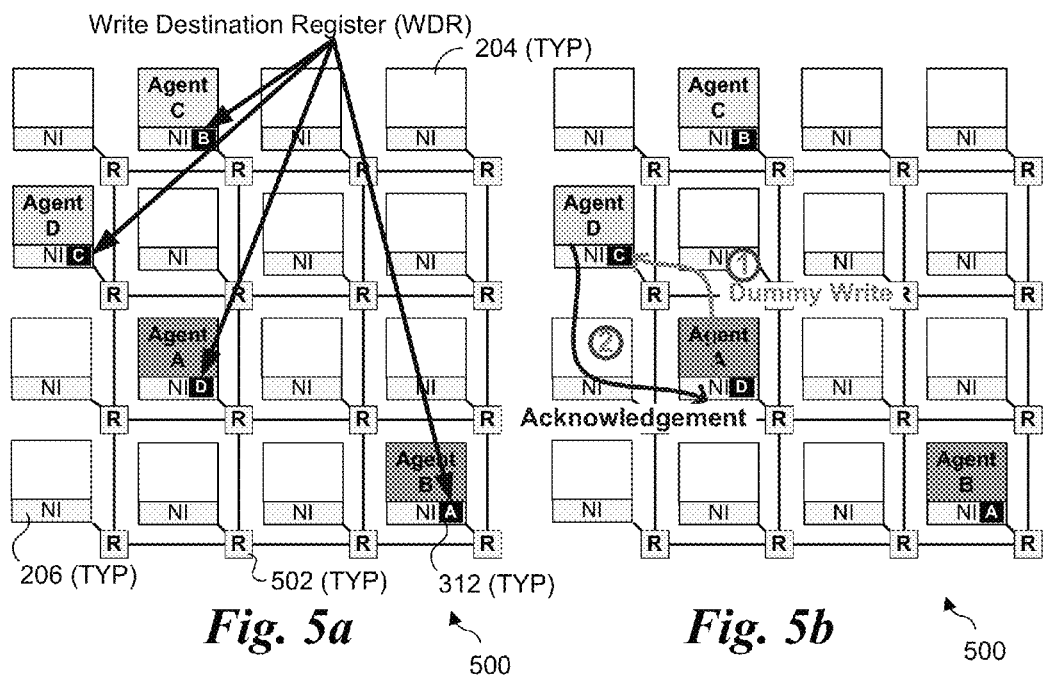
Figures 5C, 5D:
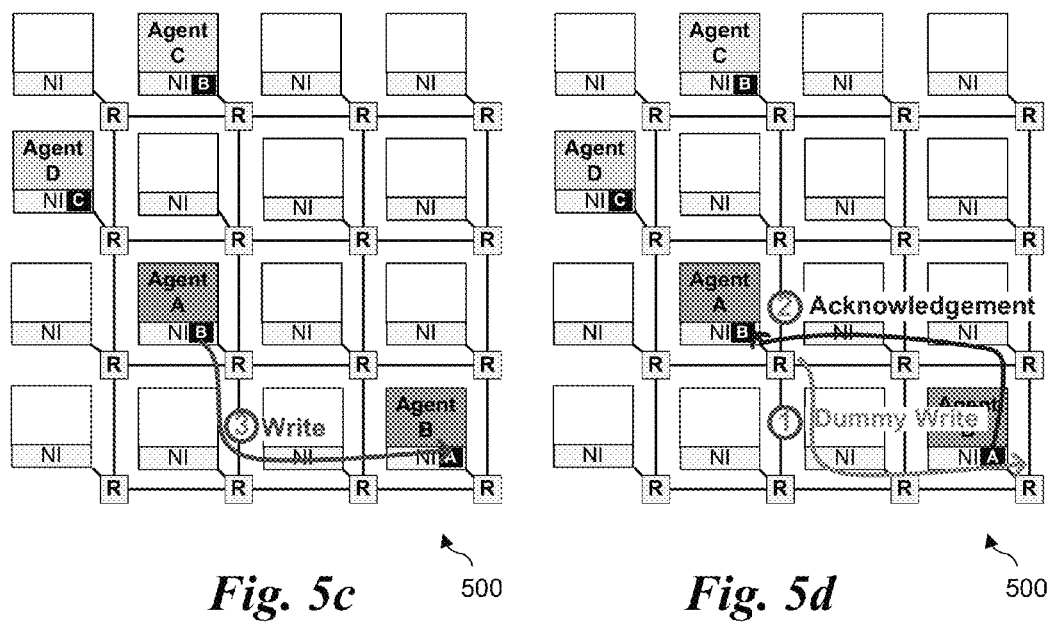

FIGS. 5a-5f illustrate a walk-through example depicting how the peer-to-peer ordering scheme works to ensure proper ordering of requests. In each of the illustrated figures, multiple agents 204 are interconnected through a mesh NoC fabric 500 as shown in FIG. 5a. Each agent 204 is operatively coupled to an NI 206 including a WDR 312. Routing in the NoC fabric is facilitated via a set of routers 502 operatively coupled to respective NI's 206. In FIGS. 5*a*-5*f*, each WDR 312 shows a destination ID corresponding to the most recent write destination from its corresponding NI.

In this example, Agent C desires to read data from Agent B. However, this data is currently being written to Agent B by agent A, so there needs to be a mechanism to ensure that Agent C does not receive stale data from Agent B. This is accomplished via use of the dummy write technique discussed above, as further described in the following details.

Step 1: Agent A Issues Multiple Writes to Agent B
(i) For the writes issued by Agent A, the NI first checks the WDR. In this example, at the time the first write issued, the WDR is "Agent D", but the destination for the write request is "Agent B", so the NI sends a "dummy write" to Agent D first (as shown in an Operation 1 in FIG. 5*b*).
(ii) When Agent D receives this "dummy write", it issues an "acknowledgement" to Agent A (Operation 2 in FIG. 5*b*).
(iii) Upon receiving the acknowledgement, the NI at Agent A changes its WDR to "Agent B" and sends the write to Agent B (Operation 3 in FIG. 5*c*).
(iv) For the following write requests to Agent B, as the destination and the WDR are the same (Agent B), the NI sends the following writes to Agent B directly.

Step 2: Agent A Sends Flag to Agent C
(i) The NI at Agent A first checks the WDR. The WDR is "Agent B", but the destination for the write request is "Agent C", so the NI sends a "dummy write" to Agent B first (to push data to Agent B, as shown by an operation 1 in FIG. 5*d*)
(ii) When Agent B receives this "dummy write", it issues an "acknowledgement" to Agent A (Operation 2 in FIG. 5*d*)
(iii) Upon receiving the acknowledgement, the NI at Agent A changes its WDR to "Agent C" and sends the write flag to Agent C (Operation 3 in FIG. 5*e*).

Step 3: Agent C Issues Read to Agent B
For read request, the NI always sends them to the destination node directly. In this case, Agent C sends all the read requests to Agent B directly (as shown in FIG. 5*f*). As the data in Agent B is already up-to-date, the data read by Agent C is correct.

The foregoing illustrates one example of a series of operations performed by various agents and associated components to facilitate data transactions in a manner that ensures that each data request results in the most recent data being returned to the requester. Although the example is described in the context of a 2D mesh fabric, it will be understood that a similar approach may be used to ensure proper ordering operations in other type of interconnect architectures, as well, including interconnect structures employing buses, hierarchies, hybrids, etc.

In the foregoing walk-through example, an SoC configuration is depicted having each NI connect to one agent. The principles and teachings disclosed herein may also be implemented for NIs that connect to multiple agents simultaneously. In this case, the NI can have one WDR shared by all underlying agents or one WDR for each agent. The former is simpler but may generate unnecessary dummy writes under some circumstances, while the latter is more efficient, but is implemented with a bit more logic. Both methods ensure correct ordering for peer-to-peer communications and have very low hardware overhead.

Exemplary SoC Configuration Employing in NoC

Figure 6:
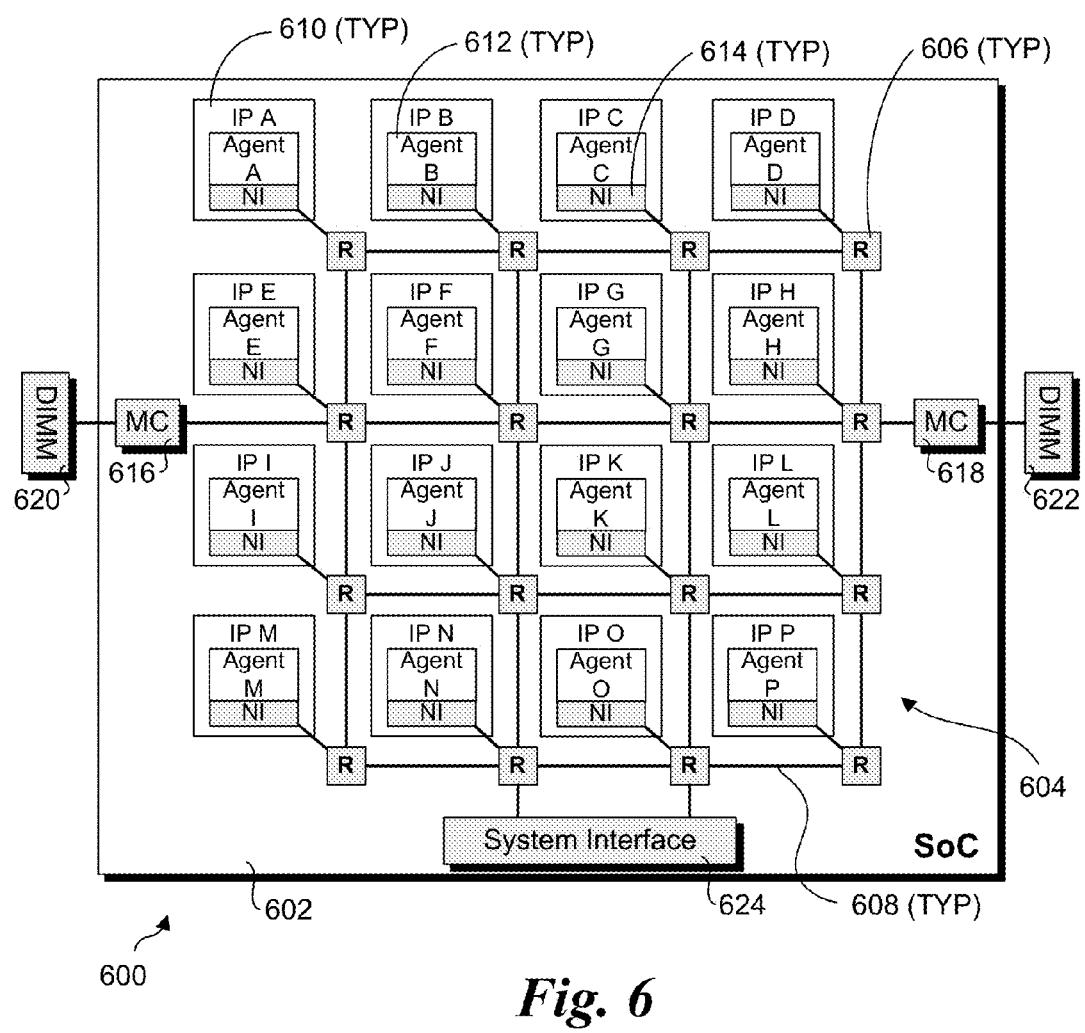
FIG. 6 is a schematic block diagram of an exemplary System on a Chip employing a Network on a Chip.

A system 600 including an SoC 602 having an exemplary configuration under which aspects of the embodiments described herein may be implemented is shown in FIG. 6. SoC 602 includes a Network on a Chip (NoC) 604 comprising a 2D Mesh interconnect fabric having a router 606 proximate to each crossbar intersection and comprising a plurality of interconnect links 608. A plurality of IP blocks 610 are coupled to respective routers 606, forming a 2D array of IP blocks. Although 16 IP blocks are shown in FIG. 6, this is merely illustrative, as the number of IP blocks can vary from a lesser number of IP blocks to many more, such as but not limited to 8, 24, 32, 48, 64, etc., as well as number in-between.

Each IP block includes an agent 612 and a network interface 614. The IP blocks are illustrative of various types of IP block commonly used in SoCs, such as processor cores, hardware accelerators (e.g., video decoders, graphics, imaging, etc), memory-related components (e.g., memory controllers), and I/O interfaces (e.g., PCIe, QPI, etc.). In the illustrated embodiment, a pair of memory controllers 616 and 618 are depicted as coupled to respective memory blocks 620 and 622 (depicted as DIMM (Dual in-line Memory Modules)) and to respective routers in NoC 604. Also depicted is a system interface 624, which is illustrative of one or more interfaces between SoC 602 and other system components that are not shown. As will be recognized by those skilled in the art, an actually SoC would include additional components that are not shown in order to not obscure the NoC aspects illustrated in FIG. 6.

In further detail, a typical processor core IP block might include a processor core coupled to or including one or more levels of cache memory (e.g., an L1/L2 cache). The cache, in turn, may employ an agent for facilitating coherent memory transactions with other cache and memory agents in the system. The agents may be employed for other purposes, as well, such as non-coherent memory transactions or other communication purposes. Moreover, although agents are depicted in FIG. 6 as a single block, a given IP block may have multiple agents associated therewith.

In addition to the logic for facilitating the transaction order and related operations discussed above, each network interface will include provisions for interfacing with the application interconnect fabric. For example, an interconnect fabric may comprises a serial multi-lane interconnect structure, such as Intel's QUICKPATH INTERCONNECT® (QPI), or Intel's KEIZER TECHNOLOGY INTERCONNECT® (KTI), an Open Core Protocol interconnect, other types of standardized or proprietary interconnects, as well as future interconnect technologies and protocols. Furthermore, the configuration of the NoC may include other types of interconnect fabric configurations, such as but not limited to torus and 3D mesh interconnects (e.g., an interconnect fabric that may be employed in future three-dimensional SoCs having IP blocks configured in a 3D array).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for facilitating peer-to-peer write and read transactions between peer agents on a chip including an interconnect fabric, comprising:
 implementing a plurality of network interfaces coupled to the interconnect fabric, each network interface associated with at least one peer agent and operatively coupled between the at least one agent and the interconnect fabric;
 originating a plurality of write and read transactions at the peer agents; and
 implementing logic in the plurality of network interfaces to order the peer-to-peer write and read transactions so as to ensure read transactions access most recent data.

2. The method of claim 1, further comprising:
 for a write transaction originating at an peer agent, storing a destination identifier (ID) corresponding to a destination of the write transaction in the network interface;
 determining, in the network interface, if a destination ID corresponding to a current write transaction originating at the peer agent is different that a destination ID corresponding to an immediately preceding write transaction originating at the agent; and, if the two destination ID's are different,
 sending out a dummy write from the peer agent onto the interconnect fabric to be routed to the previous destination prior to sending the current write transaction onto the interconnect fabric to be routed to its destination.

3. The method of claim 2, wherein the dummy write comprises a non-posted write.

4. The method of claim 2, further comprising waiting to receive an acknowledgement of the dummy write prior to sending the current write transaction to its destination.

5. The method of claim 2, wherein a network interface stores the destination ID for the most recent write transactions for each peer agent associated with the network interface and generates dummy writes when sequential write transactions originating from the same peer agent have different destination IDs.

6. The method of claim 1, wherein the plurality of network interfaces are implemented such that each network interface is associated with a respective peer agent.

7. The method of claim 2, further comprising sending a write notification to at least one other peer agent indicating the destination corresponding to the current write transaction is available for data access.

8. The method of claim 1, wherein the interconnect fabric comprises a two-dimensional mesh interconnect.

9. The method of claim 1, wherein the peer agents and interconnect fabric are implemented on a System on a Chip (SoC).

10. An apparatus comprising:
 an interconnect fabric;
 a plurality of agents;
 a plurality of processor cores, each coupled to a respective agent from among the plurality of agents;
 a plurality of network interfaces, each operatively coupled between at least one agent and the interconnect fabric and including logic for facilitating peer-to-peer communication between the plurality of agents in a manner that ensures data transactions between peer agents are ordered such that data accessed by each data transaction comprises a most recent update of the data.

11. The apparatus of claim 10, wherein the interconnect fabric comprises a Network on a Chip.

12. The apparatus of claim 10, wherein a network interface comprises logic for facilitating operations comprising,
 storing a destination identifier (ID) corresponding to a destination of first write transaction originating at an agent coupled to the network interface;
 determining if a destination ID corresponding to a second write transaction originating at the agent coupled to the network interface is different that a destination ID corresponding to the first write transaction; and if the two destination ID's are different,
 sending out a dummy write from the network interface onto the interconnect fabric to be routed to the destination for the first write transaction prior to sending the second write transaction onto the interconnect fabric to be routed to its destination.

13. The apparatus of claim 10, wherein the apparatus comprises a System on a Chip (SoC).

14. The apparatus of claim 10, wherein the apparatus includes a respective network interface coupled between each agent and the interconnect fabric.

15. The apparatus of claim 10, wherein a network interface comprises:
 an outbound queue;
 an outbound arbiter;
 a packetizer block;
 a de-packetizer block;
 an inbound queue;
 an inbound arbiter;
 and
 a register, configured to store a destination identifier (ID) of a destination corresponding to a most recent write transaction.

16. A System on a Chip (SoC), comprising:
 a plurality of Intellectual Property (IP) blocks, each having at least one peer agent and a network interface, at least a portion of the IP blocks further including a processor core separate from the at least one agent for the IP block;
 an interconnect fabric, including a plurality of routers coupled to the plurality of IP blocks via the network interfaces;
 wherein the network interfaces include logic for facilitating peer-to-peer communication between the agents in a manner that ensures data transactions between peer agents are ordered such that data accessed for each transaction comprises a most recent copy of the data.

17. The SoC of claim 16, wherein the interconnect fabric comprises a two-dimensional mesh, a plurality of torus interconnects, or a three-dimensional interconnect.

18. The SoC of claim 16, wherein the interconnect fabric and the plurality of routers comprise a Network on a Chip.

19. The SoC of claim 16, wherein at least a portion of the IP blocks comprises processor core blocks including a processor core coupled to one or more levels of cache, and wherein an agent for the processor core blocks is employed for facilitating coherent memory transactions with other cache and memory agents in the SoC.

20. The SoC of claim 16, wherein the network interfaces include logic for performing operations comprising:
 storing a destination identifier (ID) corresponding to a destination of first write transaction originating at an agent coupled to the network interface;
 determining if a destination ID corresponding to a second write transaction originating at the agent coupled to the network interface is different that a destination ID corresponding to the first write transaction; and if the two destination ID's are different, sending out a dummy write from the network interface onto the interconnect fabric to be routed to the destination for the first write transaction prior to sending the second write transaction onto the interconnect fabric to be routed to its destination.

21. The method of claim 1, wherein at least a portion of the agents is coupled to a processor core.

\* \* \* \* \*